United States Patent
Hoogenboom

[11] Patent Number: 5,566,089
[45] Date of Patent: Oct. 15, 1996

[54] SYNTAX PARSER FOR A VIDEO DECOMPRESSION PROCESSOR

[75] Inventor: Chris Hoogenboom, Calabasas, Calif.

[73] Assignee: General Instrument Corporation of Delaware, Chicago, Ill.

[21] Appl. No.: 329,500

[22] Filed: Oct. 26, 1994

[51] Int. Cl.$^6$ ................................................ G06F 17/28
[52] U.S. Cl. ...................................... 364/514 A; 395/114
[58] Field of Search ........................ 364/514 A, 715.02; 348/426, 390; 375/249; 395/114, 275, 909

[56] References Cited

U.S. PATENT DOCUMENTS

| | | | |
|---|---|---|---|
| 4,740,993 | 4/1988 | Skubrik | 375/30 |
| 5,173,695 | 12/1992 | Sun et al. | |
| 5,231,486 | 7/1993 | Acampora et al. | 358/133 |
| 5,233,348 | 8/1993 | Pollmann et al. | |
| 5,371,547 | 12/1994 | Siracusa et al. | 348/426 |
| 5,452,006 | 9/1995 | Auld | 348/390 |

OTHER PUBLICATIONS

Document MC68VDP/D, preliminary data sheet entitled "MPEG-2/DCHII Video Decompression Processor," ©Motorola Microprocessor and Memory Technologies Group, 1994.

Primary Examiner—Emanuel T. Voeltz
Assistant Examiner—Thomas Peeso
Attorney, Agent, or Firm—Barry R. Lipsitz; Ralph F. Hoppin

[57] ABSTRACT

A video syntax parser is provided for a video decompression processor. A compressed bitstream is examined until a start code is located. The start code is decoded to enable a particular parser state corresponding thereto to be initiated. The parser state is communicated to a plurality of subsystems of the video decompression processor. Each subsystem monitors the parser state to determine which parsed data following the start code, if any, is intended for that subsystem. The subsystem then retrieves the parsed data it requires via a data bus which receives the parsed data from the parser.

20 Claims, 6 Drawing Sheets

SYNTAX PARSER FOR A VIDEO DECOMPRESSION PROCESSOR

BACKGROUND OF THE INVENTION

The present invention relates to a video decompression processor, and more particularly to a video syntax parser for parsing out the fields of interest from a compressed video bitstream to various subsystems of the decompression processor.

Digital transmission of television signals can deliver video and audio services of much higher quality than analog techniques. Digital transmission schemes are particularly advantageous for signals that are broadcast via a cable television network or by satellite to cable television affiliates and/or directly to home satellite television receivers. It is expected that digital television transmitter and receiver systems will replace existing analog systems just as digital compact discs have replaced analog phonograph records in the audio industry.

A substantial amount of digital data must be transmitted in any digital television system. In a digital television system, a subscriber receives the digital data stream via a receiver/descrambler that provides video, audio and data to the subscriber. In order to most efficiently use the available radio frequency spectrum, it is advantageous to compress the digital television signals to minimize the amount of data that must be transmitted.

The video portion of a television signal comprises a sequence of video "frames" that together provide a moving picture. In digital television systems, each line of a video frame is defined by a sequence of digital data bits referred to as "pixels." A large amount of data is required to define each video frame of a television signal. For example, 7.4 megabits of data is required to provide one video frame at NTSC (National Television System Committee) resolution. This assumes a 640 pixel by 480 line display is used with eight bits of intensity value for each of the primary colors red, green and blue. At PAL (phase alternating line) resolution, 9.7 megabits of data is required to provide one video frame. In this instance, a 704 pixel by 576 line display is used with eight bits of intensity value for each of the primary colors red, green and blue. In order to manage this amount of information, the data must be compressed.

Video compression techniques enable the efficient transmission of digital video signals over conventional communication channels. Such techniques use compression algorithms that take advantage of the correlation among adjacent pixels in order to derive a more efficient representation of the important information in a video signal. The most powerful compression systems not only take advantage of spacial correlation, but can also utilize similarities among adjacent frames to further compact the data. In such systems, differential encoding is usually used to transmit only the difference between an actual frame and a prediction of the actual frame. The prediction is based on information derived from a previous frame of the same video sequence.

Examples of video compression systems using motion compensation can be found in Krause, et al. U.S. Pat. Nos. 5,057,916; 5,068,724; 5,091,782; 5,093,720; and 5,235,419. Generally, such motion compensation systems take advantage of a block-matching motion estimation algorithm. In this case, a motion vector is determined for each block in a current frame of an image by identifying a block in a previous frame which most closely resembles the particular current block. The entire current frame can then be reconstructed at a decoder by sending the difference between the corresponding block pairs, together with the motion vectors that are required to identify the corresponding pairs. Often, the amount of transmitted data is further reduced by compressing both the displaced block differences and the motion vector signals. Block matching motion estimating algorithms are particularly effective when combined with block-based spatial compression techniques such as the discrete cosine transform (DCT). Additional compression can be achieved using variable length coding to provide shorter length "code words" to events that are more likely to occur and longer code words to less likely events. At the receiver, the variable length code words are decoded by, e.g., a Huffman decoder. An example of a Huffman decoder implementation can be found, for example, in U.S. Pat. No. 5,233,348 to Pollmann, et al. and incorporated herein by reference.

Each of a succession of digital video frames that form a video program can be categorized as an intra frame (I-frame), predicted frame (P-frame), or bidirectional frame (B-frame). The prediction is based upon the temporal correlation between successive frames. Portions of frames do not differ from one another over short periods of time. The encoding and decoding methods differ for each type of picture. The simplest methods are those used for I-frames, followed by those for P-frames and then B-frames.

I-frames completely describe a single frame without reference to any other frame. For improved error concealment, motion vectors can be included with an I-frame. An error in an I-frame has the potential for greater impact on the displayed video since both P-frames and B-frames are predicted from an I-frame.

P-frames are predicted based on previous I or P frames. The reference is from an earlier I or P frame to a future P-frame and is therefore called "forward prediction." B-frames are predicted from the closest earlier I or P frame and the closest later I or P frame. The reference to a future picture (i.e., one that has not yet been displayed) is called "backward prediction." There are cases where backward prediction is very useful in increasing the compression rate. For example, in a scene in which a door opens, the current picture may predict what is behind the door based upon a future picture in which the door is already open.

B-frames yield the most compression but also incorporate the most error. To eliminate error propagation, B-frames may never be predicted from other B-frames. P-frames yield less error and less compression. I-frames yield the least compression, but are able to provide random access entry points into a video sequence.

One standard that has been adopted for encoding digital video signals is the Motion Picture Experts Group (MPEG) standard, and more particularly the MPEG-2 standard. This standard does not specify any particular distribution that I-frames, P-frames and B-frames must take within a sequence. Instead, the standard allows different distributions to provide different degrees of compression and random accessibility. One common distribution is to have I-frames about every half second and two B-frames between successive I or P frames. To decode P frames, the previous I-frame must be available. Similarly, to decode B frames, the previous and future P or I frames must be available. Consequently, the video frames are encoded in dependency order, such that all pictures used for prediction are coded before the pictures predicted therefrom. Further details of the MPEG-2standard (and the alternative DigiCipher® II standard) and its implementation in a video decompression processor can be found in document MC68VDP/D, a preliminary data sheet entitled "MPEG-2/DCII Video Decompression Processor,"© Motorola Microprocessor and Memory Technologies Group, 1994, incorporated herein by reference.

In order to implement video compression in practical systems, a video decompression processor is required for each digital television receiver. The development of very large scale integration (VLSI) integrated circuit chips is currently underway to implement such video decompression processors. In consumer products such as television sets, it is imperative that the cost of the system components be kept as low as possible.

One important subsystem of a video decompression processor is known as the video syntax parser. This subsystem is responsible for parsing out the fields of interest from the compressed video bitstream, which may be, for example, in the DigiCipher II or MPEG-2 syntax. Typically, the parser will receive its data from an external random access memory. Different subsystems of the video decompression processor will require different fields of data from the incoming bitstream. For example, a motion vector decoder will require motion vectors carried in the bitstream. A variable length code word decoder such as a Huffman decoder within the decompression processor will require the code words for decoding into transform coefficients. Other subsystems of the video decompression processor will also require various information carried in the bitstream. All of this information must be parsed from the bitstream and forwarded on to the appropriate subsystem for further processing. The parser is a speed critical subsystem. It must obtain and parse the required data from the incoming bitstream on an efficient and orderly basis. Complexity of the parser must be reduced to the extent possible in order to keep its costs at a minimum.

The present invention provides a video syntax parser that meets the aforementioned criteria.

SUMMARY OF THE INVENTION

In accordance with the present invention, a video syntax parser is provided for a video decompression processor. An input of the parser receives a compressed bitstream having data to be parsed. Means are provided for parsing the data from the compressed bitstream. Means are also provided for decoding start codes contained in the data parsed from the compressed bitstream. Means responsive to a start code decoded by the decoding means initiate a particular parser state corresponding to the start code. A parser state output communicates the parser state to a plurality of subsystems of the video decompression processor. A data output is provided for communicating parsed data from the parsing means to a data bus serving the plurality of subsystems. Each of the plurality of subsystems monitors the parser state to determine which, if any, parsed data on the data bus is intended for that subsystem. Each subsystem can then retrieve the parsed data intended for it.

In an illustrated embodiment, the parsing means comprise shift means coupled to receive and temporarily store data from the compressed bitstream. The shift means are responsive to a shift length command for outputting successive portions of the compressed bitstream to the decoding means. The shift means can comprise a barrel shifter. Data output from the barrel shifter is examined by the decoding means to locate start codes and to update the parser state during successive parser cycles between start codes. The output of the shift register also provides the parsed data to the data output, for communication to the plurality of subsystems which selectively use the data.

The barrel shifter can receive the compressed bitstream from first and second registers. The first register is responsive to an enable signal for receiving the compressed bitstream data from a source, such as a video frame store. The second register is responsive to the enable signal for receiving successive portions of the compressed bitstream data from the first register. The enable signal is provided when the shift length command reaches or exceeds a predetermined value.

The successive portions of compressed bitstream data provided to the decoding means will typically have a fixed length of N bits. The first and second registers are each N-bit registers and the barrel shifter shifts up to N bits at a time.

The shift length command is a cumulative value which is incremented by a "field length" during successive parsing cycles to control the number of bits by which the barrel shifter is shifted each cycle. The field length is dictated by the parser state during each cycle. Means are provided for truncating the cumulative value to provide a set of least significant bits for use as the shift length command and a more significant bit for providing the enable signal. In the illustrated embodiment, the five least significant bits of a six bit word are used as the shift length command and the most significant bit is used to provide the enable signal.

The compressed bitstream can include both fixed length words and variable length code words (VLC) to be parsed. In such an embodiment, the parser further comprises a selector having a first input for receiving the field length and at least one second input for receiving a VLC length. Means responsive to the parser state actuate the selector to output the field length for incrementing the cumulative value during cycles when fixed length words are to be parsed from the bitstream and for actuating the selector to output a VLC length for incrementing the cumulative value during cycles when variable length code words are to be parsed from the bitstream. Means are provided for concurrently incrementing the cumulative value by a VLC length and an end of block (EOB) length at the end of a block of variable length data being parsed from the compressed bitstream. Such structure avoids the need to use a separate parser cycle just for an end of block message.

A rate flow buffer can be coupled between the source of the compressed bitstream (e.g., the external DRAM) and the register means that are used to load the bitstream data into the shift means. The rate flow buffer is responsive to the enable signal for buffering successive portions of the compressed bitstream data from the source. In an illustrated embodiment, the rate flow buffer comprises a first-in first-out (FIFO) register coupled to receive data from a video frame store via a memory manager.

DETAILED DESCRIPTION OF THE INVENTION

Figure 1:
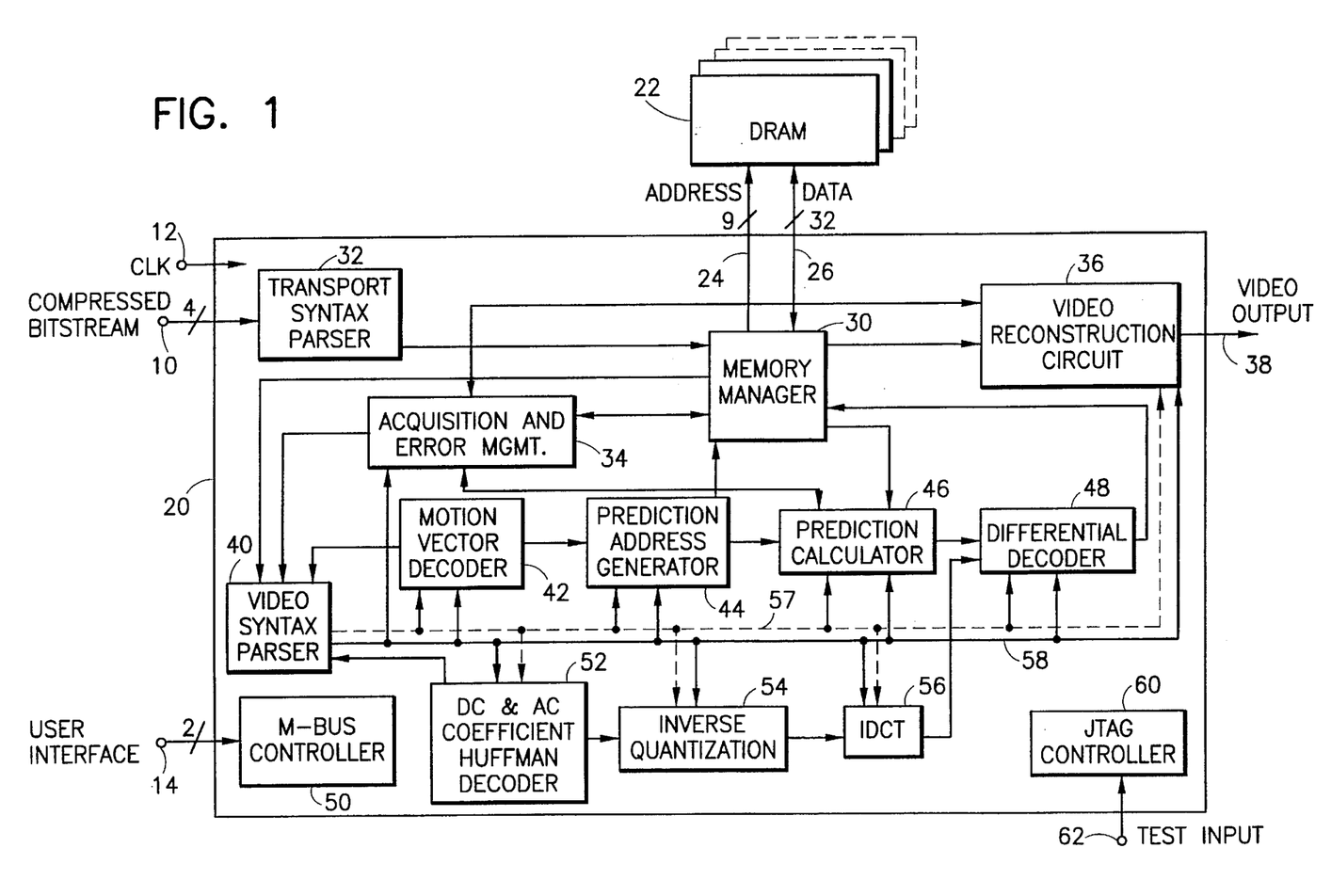
FIG. 1 is a block diagram of a video decompression processor that incorporates a video syntax parser in accordance with the present invention.

FIG. 1 is a block diagram of a video decompression processor incorporating a memory manager 30 that addresses external DRAM 22 to obtain data to be parsed in accordance with the present invention. The processor, generally designated 20, is a pipelined processor designed to decode both the transport layer (i.e., control and other non-video information) and the video layer of the compressed bitstream input via terminal 10, sometimes referred to as the "transport packet interface" of the video processor.

A user processor interface is provided at terminal 14 for control of the video data processor via an M-bus controller 50 that configures various registers in processor 20. The M-bus is a two-wire, bidirectional serial bus which provides a simple and efficient means of data exchange between devices, and is fully compatible with the $I^2C$ bus standard.

An interface to the DRAM 22 is provided via address lines 24 and data lines 26. In the specific embodiment illustrated in FIG. 1, DRAM 22 has a nine bit address port and a thirty-two bit data port.

A video output interface 38 is provided for the decompressed, reconstructed video which may, for example, be output as a standard CCIR (International Radio Consultive Committee) 656, eight bit, twenty-seven MHz multiplexed luminance (Y) and chrominance (Cr, Cb) signal.

A test interface can be provided via terminal 62 to a conventional JTAG (Joint Test Action Group) controller 60. JTAG is a standardized boundary scan methodology used for board-level testing to detect faults in package and board connections, as well as internal circuitry.

The video decompression processor 20 receives a clock signal via terminal 12. The clock provides timing information for, e.g., enabling a transport syntax parser 32 to recover timing information and video information from transport packets in the compressed bit stream input via terminal 10. An acquisition and error management circuit 34 utilizes a program clock reference (PCR) and decode time stamp (DTS) detected by a video syntax parser 40 to synchronize the start of picture decoding. This circuit sets vertical synchronization and provides global synchronization for all video decode and display functions.

The video layer is buffered in an input buffer (FIFO) configured in the external DRAM 22 by memory manager 30. The video syntax parser 40 receives the compressed video data output from the DRAM FIFO via memory manager 30, and separates the motion vector information from the coefficients describing the video information. The coefficients are processed by a Huffman decoder 52, inverse quantizer 54, and inverse discrete cosine transform (IDCT) processor 56.

Motion vectors are recovered and used to address previously decoded video frames required for reconstructing a current video frame. In particular, a motion vector decoder 42 decodes the motion vectors received from video syntax parser 40 and passes them to a prediction address generator 44. The prediction address generator provides address information necessary to retrieve, via memory manager 30, the necessary anchor frame data (i.e., I and P frame data) to enable prediction calculator 46 to provide the prediction data necessary to reconstruct a current frame block. Differential decoder 48 combines the prediction data with the decoded coefficient data to provide decompressed video data. The decompressed data is stored in appropriate buffers of DRAM 22 via memory manager 30.

It should be appreciated that the video decompression process carried out by motion vector decoder 42, prediction address generator 44, prediction calculator 46, differential decoder 48, Huffman decoder 52, inverse quantizer 54 and IDCT 56 are conventional and well understood by those skilled in the art.

Memory manager 30 schedules all activity on the external DRAM address and data buses 24, 26 and efficiently addresses DRAM 22 in accordance with the present invention. The memory manager insures that the data transfer requirements of the input FIFO portion of DRAM 22, the video syntax parser 40 and the video reconstruction circuit 36 (as well as prediction calculator 46 and differential decoder 48) are all met. The video reconstruction circuit 36 calculates a current picture and inserts closed caption, a vertical interval test signal (VITS) and test pattern data for output on video output line 38. The output display is synchronized by comparing the PCR to a presentation time stamp (PTS). A determination of when the decoding and display of a video frame must commence is made by comparing a decode time stamp (DTS) to the PTS.

The memory manager also provides a variable size for the FIFO portion of DRAM 22 depending on the decoding mode, which can be, for example, NTSC or PAL with or without bidirectional prediction frames (B-frames). The video buffer control ensures that the FIFO provided by DRAM 22 does not overflow or underflow. Buffer control is a function of system timing parameters including the PCR and DTS.

DRAM 22 is illustrated as an external memory and may be provided by a plurality of DRAM chips, such as two, four Mbit (megabit, i.e., $2^{20}$ bits) DRAMs for an eight Mbit implementation or four, four Mbit DRAMs for a sixteen Mbit implementation. It should be appreciated that in future implementations, and as memory technology advances, DRAM 22 may be provided as internal memory within the video decompression processor. The DRAM is mapped to provide various decode and output video buffers as well as a circular FIFO for the compressed input video bitstream. The DRAM may also be used to provide a test pattern buffer, a VITS buffer and a closed captioning display reordering buffer as well as to store various picture structure data necessary to properly display the decoded video frames. The DRAM can be reinitialized via memory manager 30 to provide different memory maps as required when variables are modified such as the video frame vertical size, PAL or NTSC video, the presence of test patterns, eight or sixteen Mbit memory configuration, and whether B-frames are present.

The memory manager 30 schedules all of the activity on the external DRAM buses including the data transfer requirements of the input FIFO, the video parser and the video reconstruction circuit. The memory manager also performs the required DRAM refresh in a conventional manner. For example, the same row in each of two or four external DRAMs can be refreshed simultaneously.

A small amount of FIFO can be provided as a rate flow buffer between the memory manager 30 and each of the components that accesses data from DRAM 22. For example, video syntax parser 40 contains a small rate flow buffer 72 (FIG. 2) in the path which receives data from DRAM 22 via memory manager 30. The video syntax parser requires a new data word fairly infrequently. However, when a new word is required the parser must have it immediately. Otherwise, downstream processes that require an output from the video syntax parser sit idle, reducing the efficiency of the video decompression processor. If video syntax parser 40 were to make individual requests to the DRAM each time it needed a new data word, a slow random access would result and the parsing process would be delayed. The provision of the rate flow buffer overcomes this potential problem. If, for example, the rate flow buffer can hold twenty words of DRAM data, the video syntax parser will be able to obtain a new data word that it requires immediately from the rate flow buffer. When the rate flow buffer reaches a certain preset level of emptiness, memory manager 30 is directed to read more data from the RAM. When the request for more DRAM data is serviced, the data is read in a sequential burst and stored to the rate flow buffer until it is full.

Figure 2:
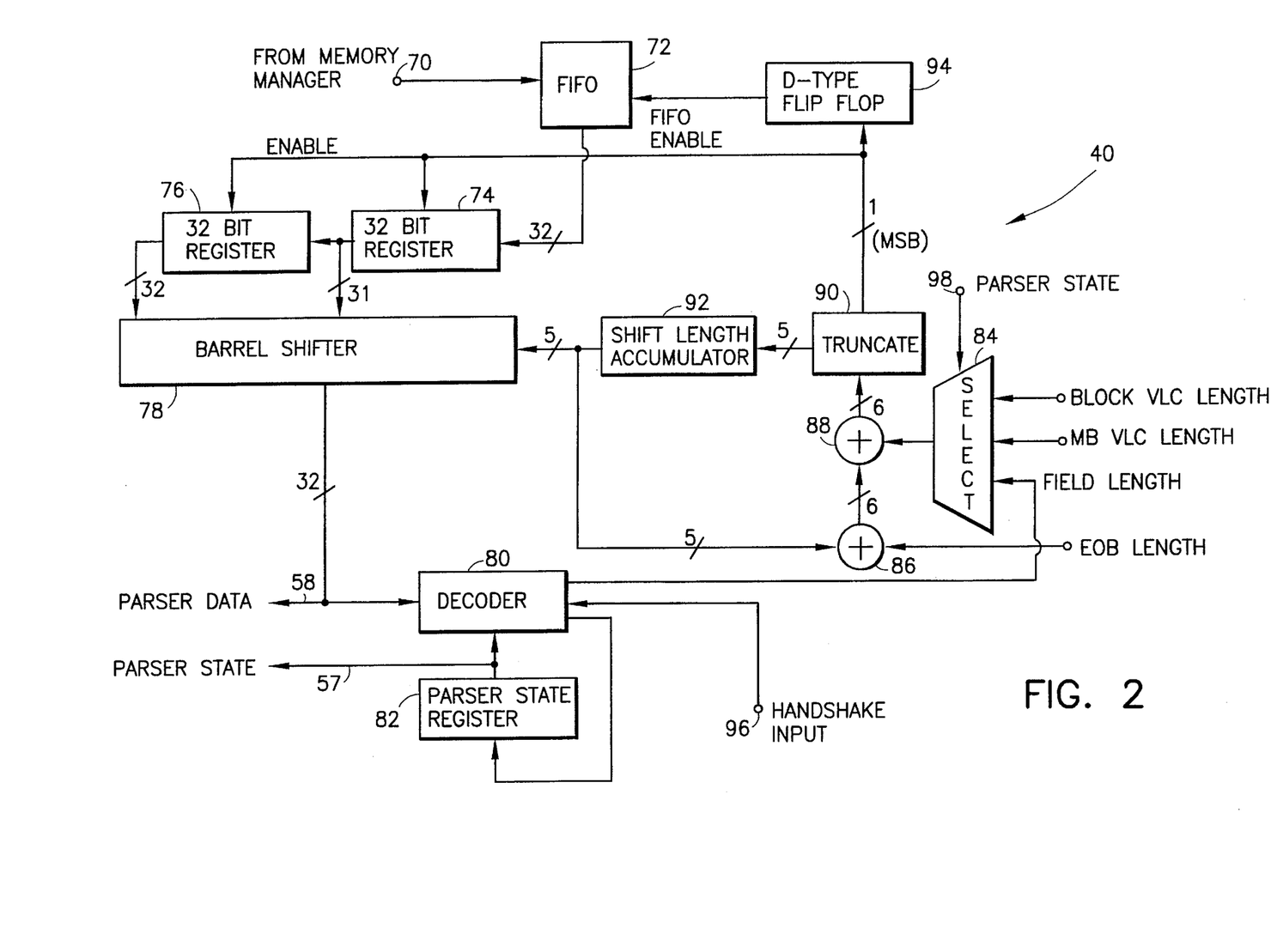
FIG. 2 is a detailed block diagram of the video syntax parser shown in FIG. 1.

The rate flow buffer helps DRAM I/O bandwidth and decoder speed because accesses are sequential and fast, usually within the same row of the DRAM, and the parser rarely runs out of data. More particularly, a request can be put in for new data before the rate flow buffer has emptied completely.

As indicated in FIG. 1, video syntax parser 40 receives compressed bitstream information from DRAM 22 via memory manager 30. The parser also receives various acquisition and error management information from circuit 34. Motion vector decoder 42 provides various handshaking information to the parser, including, for example, macroblock data requests, identification of the picture coding type, macroblock type information which is decoded by the motion vector decoder after being parsed out from the video syntax parser, and the variable code length of macroblock data. The video syntax parser also receives certain handshaking information from the Huffman decoder 52. This information includes block data requests, macroblock end information, the length of variable length codes for data blocks, and an end of block length identifier. Other handshaking information, such as vertical blanking interval user data requests and a parser enable signal are received either directly or via the acquisition and error management circuit 34.

The video syntax parser includes two output buses. Bus 57 provides the parser state to each of a plurality of subsystems (i.e., the motion vector decoder 42, prediction address generator 44, prediction calculator 46, differential decoder 48, Huffman decoder 52, inverse quantizer 54, IDCT 56 and video reconstruction circuit 36) of video decompression processor 20. A data bus 58 communicates parsed data from the video syntax parser to the various subsystems of the video decompression processor requiring such data. Each subsystem coupled to buses 57 and 58 will monitor the current parser state to determine if subsequent data in the parsed data stream is intended for that subsystem. If the parser state indicates that parsed data for the subsystem follows, the subsystem will retrieve that data and process it accordingly.

The video syntax parser is illustrated in greater detail in FIG. 2. The compressed bitstream information to be parsed is received from DRAM 22 via memory manager 30 at terminal 70. The data is buffered in FIFO 72 for subsequent transfer to a first register 74. In the particular implementation illustrated, register 74 is a 32 bit register, although those skilled in the art will appreciate that the data can be processed in different word lengths depending upon particular system requirements. Initially, a first 32 bits of information are loaded into register 74. During a subsequent clock cycle, the contents of register 74 are loaded into register 76 while register 74 receives another 32 bits of information from FIFO 72.

A barrel shifter (or equivalent shift means) 78 receives the data from registers 74 and 76 for subsequent output of appropriate portions thereof to decoder 80 and to the parser data bus 58.

One purpose of decoder 80 is to search for start codes in the data output from barrel shifter 78. Decoder 80 can be implemented as a state machine. Once a start code is located and decoded, the current state of the state machine will determine the length of the next field in the video syntax. That length updates a shift length by which the barrel shifter shifts. A running total of the five least significant bits (LSB's) of the shift length is maintained in a shift length accumulator 92 and is applied to the shift length input of the barrel shifter. The most significant bit (MSB) of the six bit shift length is used to actuate shifts of greater than 31 bits. Such shifts are provided by transferring the contents of first register 74 to second register 76. At the same time, first register 74 will receive new data from FIFO 72. During the next cycle, new data from FIFO 72 is presented to register 74 in response to a FIFO enable signal, which is the enable signal used to actuate registers 74 and 76 delayed by one clock cycle by D-type flip flop 94.

Figure 3:
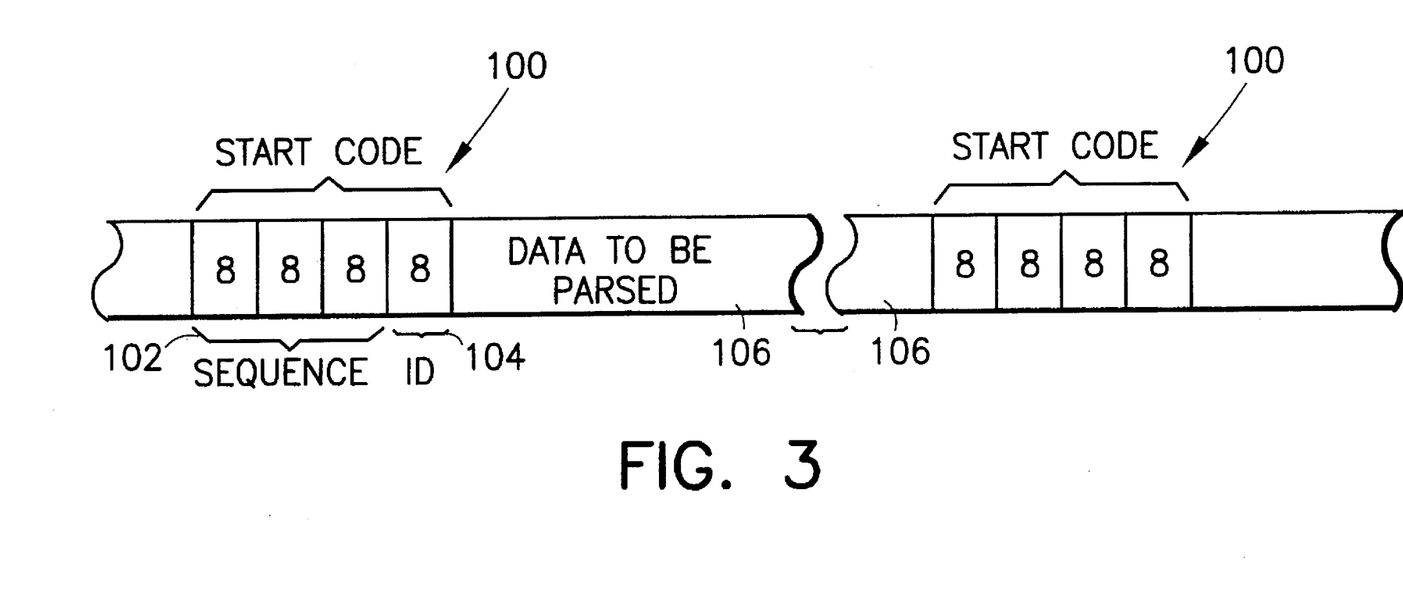
FIG. 3 is a diagrammatic illustration of a compressed bitstream including start codes and data to be parsed.

FIG. 3 illustrates, in diagrammatic form, a compressed bitstream to be parsed by the video syntax parser of FIG. 2. The decoder 80 monitors successive 32 bit words output from barrel shifter 78 to locate a start code. Since the bitstream is provided in a byte aligned manner, in searching for a start code the barrel shifter is successively shifted by one byte (8 bits) at a time until a 24 bit start code sequence 102 is found in the 32 bit start code 100. For example, start code sequence 102 can comprise a series of 23 zeros followed by a binary "1". Upon recognition of this sequence, decoder 80 will decode the next byte, which comprises an 8-bit start code identification (ID) 104. The start code ID identifies the particular category of information following the start code. The following information is the actual data 106 to be parsed out to the different subsystems of decompression processor 20.

The various categories of data to be parsed are dictated by the MPEG-2 or DigiCipher II standards. The MPEG-2 standard is described in detail in the International Standards Organization publication no. ISO/IEC 13818-2 entitled "Coding of Moving Pictures and Associated Audio," incorporated herein by reference. The categories of information that can be identified by the start code identifier 104 in an MPEG-2 or DCII embodiment can include, for example, a sequence header, sequence extension, extension and user data, user data, sequence display extension, group of pictures header, picture header, picture extension, picture data, slice layer, macroblock layer, and block layer.

Various different information is included within each of the categories. For example, a start code identifying a sequence header means that the subsequent data to be parsed includes a sequence header code, horizontal size value, vertical size, sample aspect ratio, frame rate, bit rate, buffer size information, and may also include an intra quantizer matrix and/or a non-intra quantizer matrix. In addition, sequence header information can comprise various marker bits and flags necessary to properly parse and decode the data. Each of the other categories referred to above will comprise their own layers of information to be used by different subsystems within the video decompression processor. Since the location of each of the various information types contained in the compressed bitstream is dictated by the MPEG and DigiCipher standards, once the start code is located the identity and location of all following information until the next start code is easily identifiable, e.g., by the use of look up tables which can be provided in synthesized read only memories. The video syntax parser 40 will contain a look up table for the length of each subsequent field in the data to be parsed following a start code. Look up tables for decoding the data itself are provided in the various subsystems of the video decompression processor that communicate with the video syntax parser. For example, motion vector decoder 42 and Huffman decoder 52 decode and feed back various handshaking information to the video syntax parser as described above.

While searching for a start code, decoder 80 will output a "field length" signal to cause barrel shifter 78 to be shifted by one byte (8 bits) during each successive parser cycle. The field length output from decoder 80 is coupled to an adder 88 via selector 84. The selector 84 can output any one of three signals input thereto, in response to the current parser state input via terminal 98. When the parser is initially attempting to locate a first start code, the parser state will be in a signal acquisition mode that will cause selector 84 to output the 8-bit field length for summation with the previous shift length output from shift length accumulator 92. The previous shift length is input to adder 88 via an adder 86. The purpose of adder 86 is to increase the shift by an end of block (EOB) length at the end of every block of DCT coefficients processed by the Huffman decoder. The EOB length is output from the Huffman decoder 52 and is summed with the last variable length coded coefficient in each block to avoid the need to waste a separate clock cycle just for the EOB length.

After the field length is added to the prior shift length in adder 88, the result is truncated in circuit 90 to provide the five least significant bits of the sum to shift length accumulator 92 and the most significant sixth bit to flip flop 94. This sixth bit provides the enable signal for registers 74 and 76, which load new data each time the state of the bit changes. The bit is also delayed by the flip flop 94 and used to enable the FIFO 72 to present data for loading into register 74 during the next enable cycle.

Upon locating a start code and decoding the start code identifier, a new parser state will be output from decoder 80 and stored in parser state register 82. The parser state is also communicated to each of the decompression processor subsystems coupled to parser state bus 57. As subsequent data is decoded, the parser state will change and will indicate to each subsystem which data is present so that the subsystems can retrieve appropriate data for further processing.

The various handshaking information referred to above is input to decoder 80 via terminal 96. This information can include a macroblock data request, block data request, macroblock type, picture coding type, macroblock end, VBI user data request, and/or a parser enable signal. When variable length code words are being decoded instead of fixed length words, the length of each code word is input to selector 84 from motion vector decoder 42 in the case of a macroblock (MB VLC length) or from Huffman decoder 52 in the case where the code word is representative of data from an individual block (BLOCK VLC length). The parser state input at terminal 98 will actuate selector 84 to output the BLOCK VLC or MB VLC length as appropriate.

Figure 4:
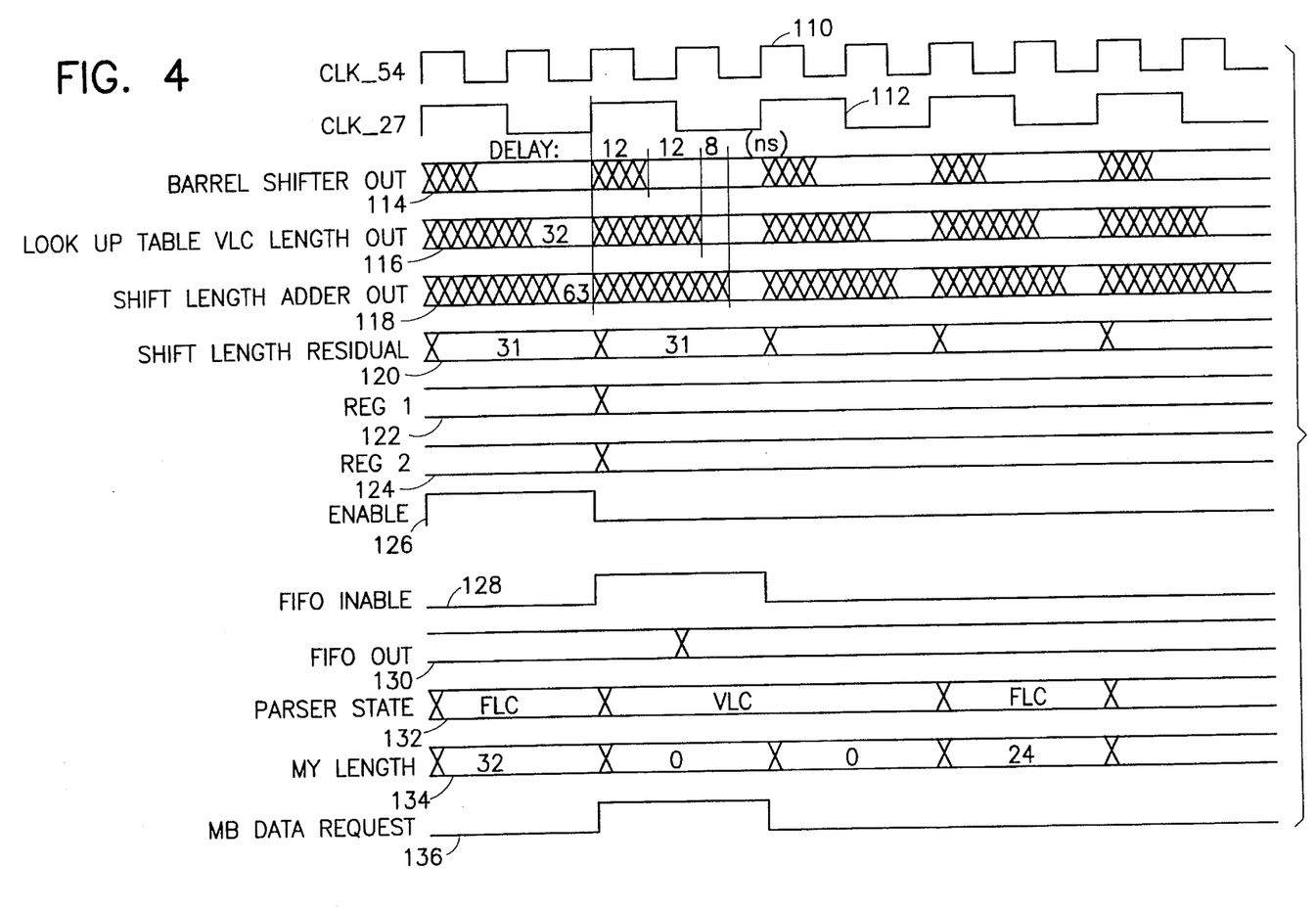
FIG. 4 is a timing diagram for the video syntax parser illustrated in FIG. 2.

FIG. 4 is a timing diagram for various signals within the video syntax parser. Signals 110 and 112 are 54 MHz and 27 MHz clocks, respectively. Signal 114 represents the output from barrel shifter 78. As indicated, various delays inherent in the parser provide very tight timing during which limited opportunities are available for performing parser operations. Signal 116 represents the output from the lookup table that provides the length of each variable length code word. The output from the shift length adder 88 and the timing of the shift length bits input to accumulator 92 is represented by timing line 118. The shift length residual is indicated by timing line 120. The loading of the first and second registers 74, 76 is indicated by signals 122, 124 which are responsive to the enable signal 126. As can be seen, the FIFO enable signal 128 is delayed by one clock cycle. The output of FIFO 72 is indicated by timing line 130. An example of different parser states, including times where fixed length (FLC) and variable length (VLC) codes are being processed is indicated at 132. The length of fixed length code words (my-length) output from the decoder 80 is indicated at 134. A macroblock data request signal from motion vector decoder 42 is indicated at 136.

Figure 5A:
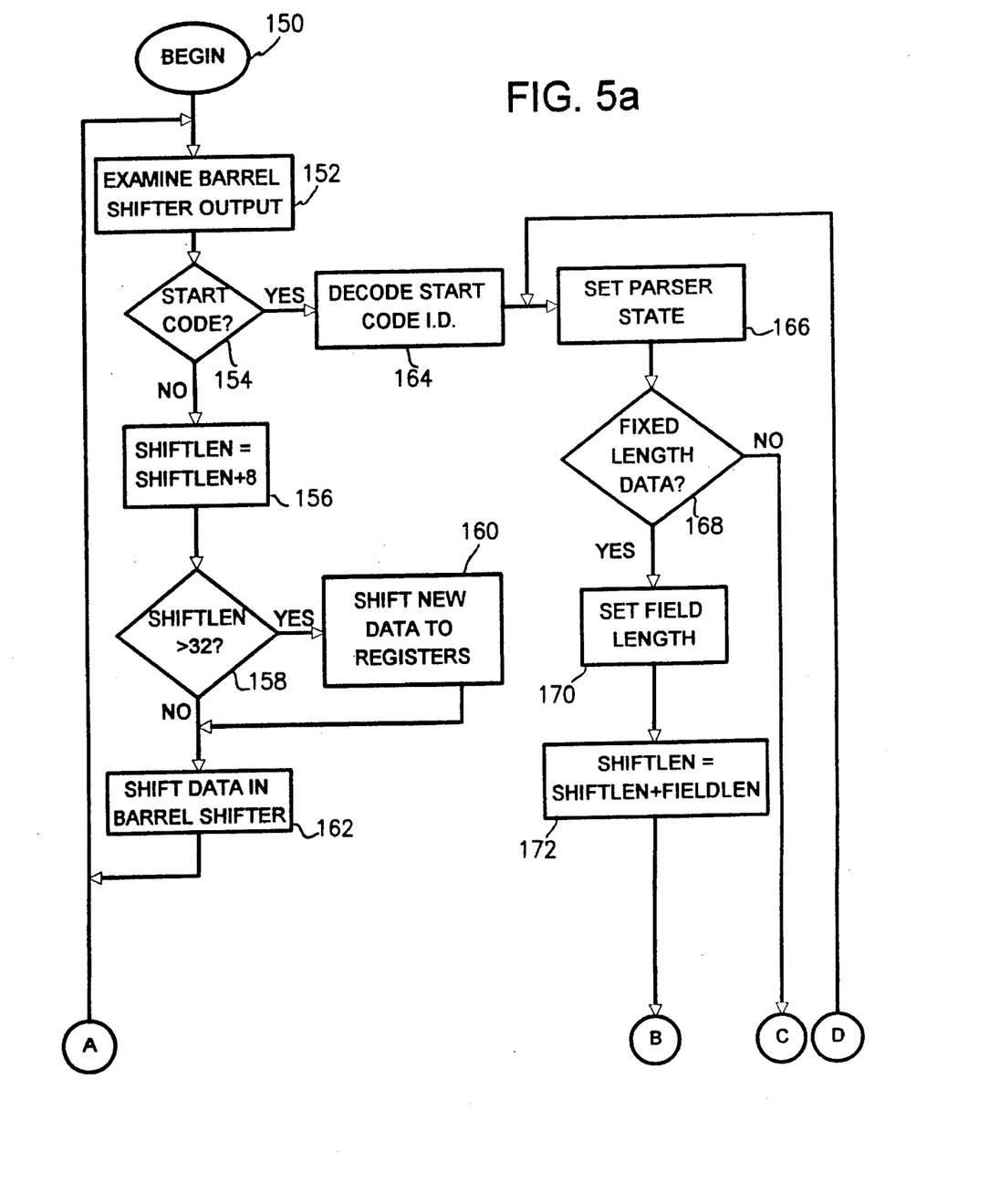
FIGS. 5a and 5b provide a flow chart illustrating the operation of the video syntax parser of FIG. 2.
Figure 5B:
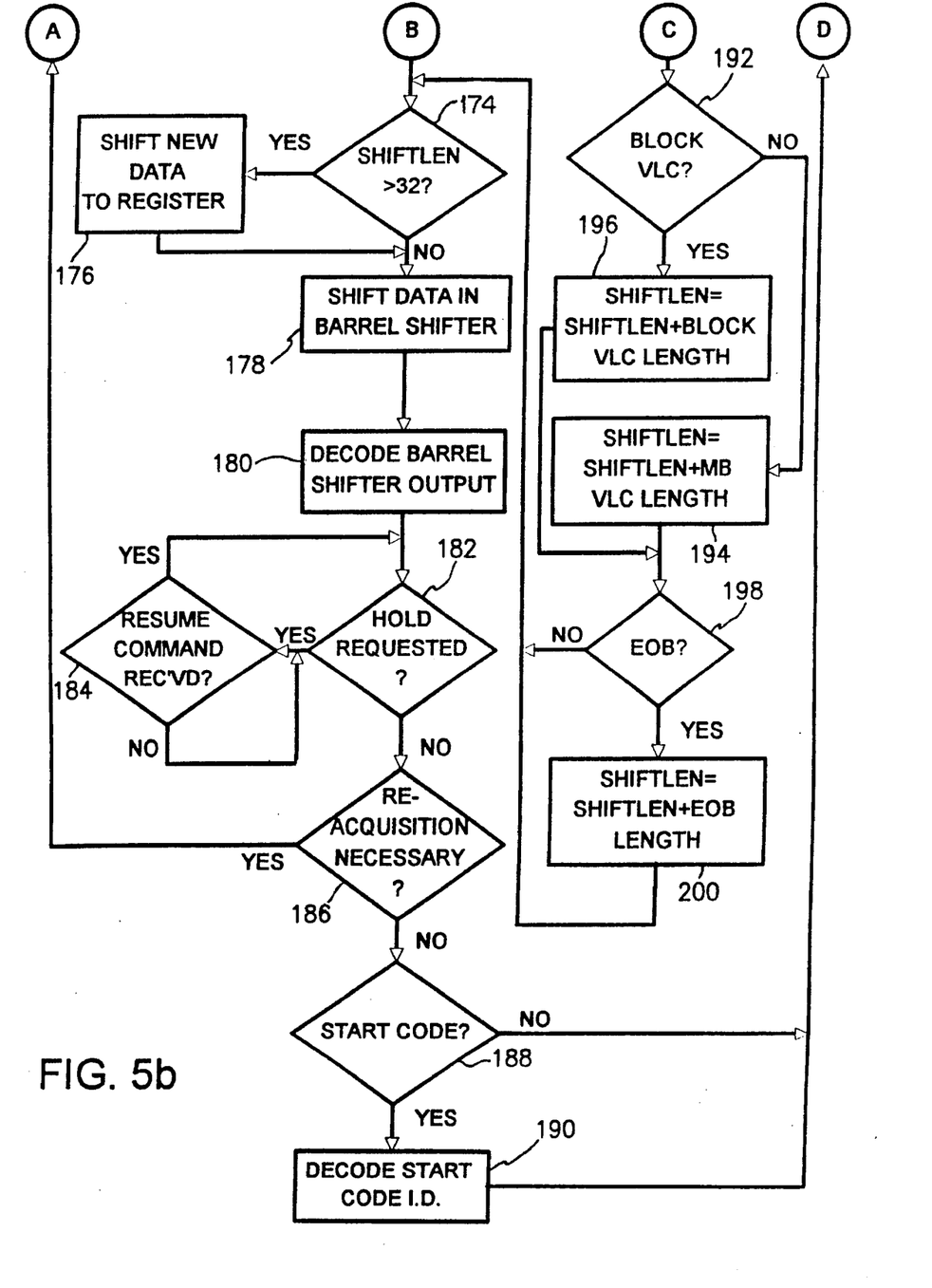

FIGS. 5a and 5b comprise a flowchart illustrating the operation of the parser. The flowchart begins at 150, and at box 152 the barrel shifter output is examined by decoder 80 (FIG. 2) in search of an initial start code. If the first 32 bits presented to the decoder do not represent a start code, as determined at box 154, the shift length (which starts out at zero) is incremented by the field length, which is set to eight bits when the decoder is searching for a start code. The incrementing of the shift length is indicated at box 156. At box 158, a determination is made as to whether the shift length exceeds a value of 32. If it does, the state of the most significant bit of the six bit sum from adder 88 will change, generating an enable signal to shift new data from the FIFO 72 to register 74 as indicated at box 160. At the same time, the old data from register 74 will be loaded into register 76. After the data has been shifted, or in the event that the shift length did not exceed a value of 32, the data in the barrel shifter will be shifted by the shift length as indicated at box 162.

The routine then continues with the decoder 80 searching successive 32 bit words (each shifted eight bits with respect to the previous word) until the first start code is located. At this point, the routine will pass from box 154 to box 164 where the start code ID is decoded. This will identify the category of information following the start code, and the parser state will then be set accordingly at box 166. At box 168, a determination is made as to whether the next field of data is fixed length data. If so, the field length is set at box 170 so that the next shift length can be computed as indicated at box 172.

At box 174 (FIG. 5b) a determination is made as to whether the new shift length exceeds a value of 32. If so, registers 74 and 76 will be enabled to receive new data. FIFO 72 will also be enabled during the subsequent parser cycle to present new data at the input of register 74.

At box 178, the barrel shifter is shifted by the new shift length and the barrel shifter output is then decoded as indicated at box 180. At box 182, a determination is made as to whether any of the subsystems receiving data from the parser have requested the parser operation to be temporarily put on hold. For example, Huffman decoder 52 may temporarily need to stop the parser to allow a code word to be decoded into more than one coefficient. To do this, a block data request signal will be communicated from the Huffman decoder to the decoder 80 of the video syntax parser via handshake input 96. When a hold is requested, box 184 monitors the situation to determine when a resume command (or release of the hold command) is received. When this happens, the routine proceeds back to box 182 and when no further holds are present, a determination is made at box 186 as to whether any errors have occurred that would require reacquisition of the bitstream. For example, if the sequence of data has been lost such that a next start code can not be located, it will be necessary to return back to box 152 to acquire an initial start code so that parsing of the bitstream can recommence. Thus, box 186 provides an escape path in the event that subsequent start codes in the compressed bitstream are not located when expected. At box 188, a determination is made as to whether a new start code has been received when expected during normal processing of the bitstream. If so, the start code identification is decoded as indicated at box 190, and the routine returns back to box 166 (FIG. 5a) where the new parser state dictated by the decoded start code ID is set.

In the event that variable length data is encountered in the bitstream, the routine will flow from box 168 to box 192 (FIG. 5b) where a determination is made as to whether a block variable length code word is present. If so, the shift length will be incremented by the block VLC length input to selector 84 from Huffman decoder 52. Otherwise, macroblock variable length data will be present and the shift length will be incremented by the MB VLC length as indicated at box 194. At the end of each block, Huffman decoder 52 will provide an EOB length to adder 86 as indicated at box 198, so that the shift length can be additionally incremented by the end of block length, as shown at box 200. The process continues to box 174 to enable each subsequent portion of data between start codes to be properly parsed and passed on to the appropriate subsystem.

It should now be appreciated that the present invention provides a syntax parser for parsing out the fields of interest from, e.g., the MPEG-2 or DigiCipher II syntax. Variable length code fields are parsed with feedback from the VLC decoder to determine the end of the VLC field. The parser has a parser state bus and a data output bus. All relevant areas of the syntax are uniquely defined by the current parser state, making it easy for each subsystem receiving data from the parser to determine when a field of interest to it is present. Each subsystem decodes the current parser state and updates its registers accordingly.

Although the invention has been described in connection with a specific embodiment thereof, those skilled in the art will appreciate that numerous adaptations and modifications may be made thereto without departing from the spirit and scope of the invention as set forth in the claims.

What is claimed is:

1. In a video decompression processor, a video syntax parser comprising:

an input for receiving a compressed bitstream having data to be parsed;

means for parsing said data from said compressed bitstream;

means for decoding start codes contained in the data parsed from said compressed bitstream;

means responsive to a start code decoded by said decoding means for initiating a particular parser state corresponding to said start code;

a parser state output for communicating said parser state to a plurality of subsystems of said video decompression processor; and a data output for communicating parsed data from said parsing means to a data bus serving said plurality of subsystems; wherein:

each of said plurality of subsystems monitors said parser state to determine which parsed data on said data bus, if any, is intended for that subsystem so that the subsystem can retrieve the parsed data intended therefor; and said decoding means continue to decode the data parsed from said data stream after said start code has been decoded to update said parser state during successive parser cycles until a new start code occurs.

2. A video syntax parser in accordance with claim 1 wherein said parsing means comprise:

shift means coupled to receive and shift data from said compressed bitstream, said shift means being responsive to a shift length command for outputting successive portions of said compressed bitstream to said decoding means.

3. A video syntax parser in accordance with claim 2 wherein said shift means comprise a barrel shifter.

4. A video syntax parser in accordance with claim 3 wherein said successive portions of said compressed bitstream are also output from said data output.

5. A video syntax parser in accordance with claim 3 wherein said barrel shifter receives said compressed bitstream data from first and second registers coupled to inputs of said barrel shifter, said first register being responsive to an enable signal for receiving said compressed bitstream data from a source and said second register being responsive to said enable signal for receiving successive portions of said compressed bitstream data from said first register, said enable signal being provided when said shift length command reaches a predetermined value.

6. A video syntax parser in accordance with claim 5 wherein:

said successive portions of compressed bitstream data provided to said decoding means are each N bits in length;

said first and second registers are each N-bit registers; and said barrel shifter shifts up to N bits at a time.

7. A video syntax parser in accordance with claim 5 wherein:

said shift length command is a cumulative value which is incremented by a field length during successive parsing cycles to control the number of bits by which said barrel shifter is shifted each cycle;

said field length is dictated by said parser state during each cycle; and means are provided for truncating said cumulative value to provide a set of least significant bits for use as said shift length command and a more significant bit for providing said enable signal.

8. A video syntax parser in accordance with claim 7 wherein said compressed bitstream includes both fixed length words and variable length code words (VLC) to be parsed, said parser further comprising:

a selector having a first input for receiving said field length and at least one second input for receiving a VLC length; and means responsive to said parser state for actuating said selector to output said field length for incrementing said cumulative value during cycles when fixed length words are to be parsed from said bitstream and for actuating said selector to output a VLC length for incrementing said cumulative value during cycles when variable length code words are to be parsed from said bitstream.

9. A video syntax parser in accordance with claim 8 further comprising means for concurrently incrementing said cumulative value by a VLC length and an end of block length at the end of a block of variable length data being parsed from said compressed bitstream.

10. A video syntax parser in accordance with claim 2 wherein:

said shift length command is a cumulative value which is incremented by a field length during successive parsing cycles to control the number of bits by which said shift register is shifted each cycle;

said field length is dictated by said parser state during each cycle; and means are provided for truncating said cumulative value to provide a set of least significant bits for use as said shift length command and a more significant bit for providing said enable signal.

11. A video syntax parser in accordance with claim 2 wherein said successive portions of said compressed bitstream are also output from said data output.

12. A video syntax parser in accordance with claim 2 further comprising:

register means responsive to an enable signal for receiving said compressed bitstream data from a source and passing it to said shift means, said enable signal being provided when said shift length command reaches a predetermined value.

13. A video syntax parser in accordance with claim 12 further comprising a rate flow buffer coupled between said source and said register means, said rate flow buffer being responsive to said enable signal for buffering successive portions of said compressed bitstream data from said source.

14. A video syntax parser in accordance with claim 1, wherein said parser state is communicated to said plurality of subsystems via a communication path which is different than said data bus.

15. In a video decompression processor, a video syntax parser comprising:

an input for receiving a compressed bitstream having data to be parsed;

means for parsing said data from said compressed bitstream;

means for decoding start codes contained in the data parsed from said compressed bitstream;

means responsive to a start code decoded by said decoding means for initiating a particular parser state corresponding to said start code;

a parser state output for communicating said parser state to a plurality of subsystems of said video decompression processor; and a data output for communicating parsed data from said parsing means to a data bus serving said plurality of subsystems; wherein:

each of said plurality of subsystems monitors said parser state to determine which parsed data on said data bus, if any, is intended for that subsystem so that the subsystem can retrieve the parsed data intended therefor;

said parsing means comprise shift means coupled to receive and shift data from said compressed bitstream, said shift means being responsive to a shift length command for outputting successive portions of said compressed bitstream to said decoding means;

said shift length command is a cumulative value which is incremented by a field length during successive parsing cycles to control the number of bits by which said shift register is shifted each cycle;

said field length is dictated by said parser state during each cycle; and means are provided for truncating said cumulative value to provide a set of least significant bits for use as said shift length command and a more significant bit for providing said enable signal.

16. A video syntax parser in accordance with claim 15 wherein said compressed bitstream includes both fixed length words and variable length code words (VLC) to be parsed, said parser further comprising:

a selector having a first input for receiving said field length and at least one second input for receiving a VLC length; and means responsive to said parser state for actuating said selector to output said field length for incrementing said cumulative value during cycles when fixed length words are to be parsed from said bitstream and for actuating said selector to output a VLC length for incrementing said cumulative value during cycles when variable length code words are to be parsed from said bitstream.

17. A video syntax parser in accordance with claim 16 further comprising means for concurrently incrementing said cumulative value by a VLC length and an end of block length at the end of a block of variable length data being parsed from said compressed bitstream.

18. A video syntax parser in accordance with claim 15 wherein said decoding means continue to decode the data parsed from said data stream after said start code has been decoded to update said parser state during successive parser cycles until a new start code occurs.

19. A video syntax parser in accordance with claim 15, wherein said parser state is communicated to said plurality of subsystems via a communication path which is different than said data bus.

20. In a video decompression processor, a video syntax parser comprising:

an input for receiving a compressed bitstream having data to be parsed;

means for parsing said data from said compressed bitstream;

means for decoding start codes contained in the data parsed from said compressed bitstream;

means responsive to a start code decoded by said decoding means for initiating a particular parser state corresponding to said start code;

a parser state output for communicating said parser state to a plurality of subsystems of said video decompression processor;

a data output for communicating parsed data from said parsing means to a data bus serving said plurality of subsystems;

wherein each of said plurality of subsystems monitors said parser state to determine which parsed data on said data bus, if any, is intended for that subsystem so that the subsystem can retrieve the parsed data intended therefor;

wherein said parsing means comprise shift means coupled to receive and shift data from said compressed bitstream, said shift means being responsive to a shift length command for outputting successive portions of said compressed bitstream to said decoding means;

wherein said successive portions of said compressed bitstream are also output from said data output; and a rate flow buffer coupled between said source and said register means, said rate flow buffer being responsive to said enable signal for buffering successive portions of said compressed bitstream data from said source.

\* \* \* \* \*

UNITED STATES PATENT AND TRADEMARK OFFICE
CERTIFICATE OF CORRECTION

PATENT NO. : 5,566,089
DATED : Oct. 15, 1996
INVENTOR(S) : Hoogenboom

It is certified that error appears in the above-identified patent and that said Letters Patent is hereby corrected as shown below:

Column 13, line 10: "said enable signal" should be --an enable signal--.

Column 14, line 2: "said enable signal" should be --an enable signal--.

Column 14, line 63: "said enable signal" should be --an enable signal--.

Signed and Sealed this

Second Day of December, 1997

*Attest:*

BRUCE LEHMAN

*Attesting Officer*     *Commissioner of Patents and Trademarks*